No. 652,191. Patented June 19, 1900.
F. J. LUDINGTON.
MACHINE FOR MAKING CIGARETTES.
(Application filed Feb. 21, 1898.)
(No Model.) 10 Sheets—Sheet 1.

No. 652,191. Patented June 19, 1900.
F. J. LUDINGTON.
MACHINE FOR MAKING CIGARETTES.
(Application filed Feb. 21, 1898.)
(No Model.) 10 Sheets—Sheet 2.

No. 652,191. Patented June 19, 1900.
F. J. LUDINGTON.
MACHINE FOR MAKING CIGARETTES.
(Application filed Feb. 21, 1898.)

(No Model.) 10 Sheets—Sheet 5.

No. 652,191. Patented June 19, 1900.
F. J. LUDINGTON.
MACHINE FOR MAKING CIGARETTES.
(Application filed Feb. 21, 1898.)
(No Model.) 10 Sheets—Sheet 6.

No. 652,191. Patented June 19, 1900.
F. J. LUDINGTON.
MACHINE FOR MAKING CIGARETTES.
(Application filed Feb. 21, 1898.)
(No Model.) 10 Sheets—Sheet 9.

No. 652,191. Patented June 19, 1900.
F. J. LUDINGTON.
MACHINE FOR MAKING CIGARETTES.
(Application filed Feb. 21, 1898.)
(No Model.) 10 Sheets—Sheet 10.

UNITED STATES PATENT OFFICE.

FRANK J. LUDINGTON, OF WATERBURY, CONNECTICUT, ASSIGNOR TO THE LUDINGTON COMPANY, OF NEW HAVEN, CONNECTICUT.

MACHINE FOR MAKING CIGARETTES.

SPECIFICATION forming part of Letters Patent No. 652,191, dated June 19, 1900.

Application filed February 21, 1898. Serial No. 671,049. (No model.)

*To all whom it may concern:*

Be it known that I, FRANK J. LUDINGTON, of Waterbury, in the county of New Haven and State of Connecticut, have invented a new Improvement in Machines for Making Cigarettes; and I do hereby declare the following, when taken in connection with the accompanying drawings and the letters of reference marked thereon, to be a full, clear, and exact description of the same, and which said drawings constitute part of this specification, and represent, in—

Fig. 2, a view of the machine in side elevation looking at its left-hand side with its wrapper-cutting mechanism removed, with the exception of the feeding-table, which is shown in section; Fig. 2ª, a detail view showing the platen-tilting cam; Fig. 10ª, a detached broken view, in inside elevation, of the gripper-oscillating slide.

My invention relates to an improvement in machines for making all-tobacco cigarettes and constitutes an improvement upon the machine shown and described in United States Patent No. 454,593, granted June 23, 1891, to The Ludington Company of New Haven, Connecticut, for an improved cigarette-machine, which in that case was designed to produce paper cigarettes, or, in other words, cigarettes having paper wrappers.

The object of my present invention is to produce a simple and effective machine having a large capacity for producing all-tobacco cigarettes of superior quality of workmanship.

With these ends in view my invention consists in a machine for making all-tobacco cigarettes and more particularly to the construction, arrangement, and operation of the wrapper-cutting, wrapper holding and conveying, and wrapper-pasting instrumentalities thereof, all as will be hereinafter described, and pointed out in the claims.

In carrying out my invention, as herein shown, I employ a hollow rectangular wrapper-cutting punch A, conforming in its external dimensions to the size of the wrappers which it is designed that the machine shall cut from tobacco-leaves fed into it one by one by hand. This punch is removably attached by means of screws B to a block C, which is secured by bolts D to a plunger E, secured in place by a cap F, bolted to the head G of the machine. At its projecting upper end the said plunger is pivotally connected with the forked outer end of a long lever H, hung upon a horizontally-arranged stud I, mounted in a bracket J, bolted to the arm K of the machine-frame K'. The inner end of said lever is connected with the upper end of a rod L, the lower end of which is connected with the upper arm N of a bell-crank lever, hung upon a stud N' and having its lower arm $N^2$ provided with an antifriction-roll $N^3$, which rides upon the surface of the punch-operating cam $N^4$, mounted upon the short horizontal driven shaft O, which is mounted at its ends in brackets O' O', bolted to the machine-frame, and provided with a sprocket-wheel $O^2$, through which it is driven by means of a sprocket-chain $O^3$, running over a sprocket-wheel $O^4$, mounted upon the shaft $i^4$, which carries a large gear-wheel $O^5$, which in turn meshes into a large gear-wheel $O^6$, mounted on the shaft $X^9$ and meshed into by a pinion $O^7$, mounted on the main driving-shaft $O^8$, which carries the driving-pulley $O^9$ over which runs a belt from any convenient source of power. It will be understood that the cam $N^4$ is adapted in its peripheral conformation to operate through the train of parts described to raise and lower the punch A, as required. Two spiral springs P P, connected at their upper ends with the forward end of the lever H and at their lower ends with the head G, are provided for exerting a constant effort to pull the plunger E, and hence the punch, downward, and act in opposition to the cam $N^4$, before mentioned. Within the punch I locate a rectangular skeleton clamp Q, which is enough smaller in its external dimensions than the internal dimensions of the rectangular punch A to permit it to be raised and lowered therein independently thereof. This clamp is formed upon its lower face with four longitudinally-arranged rubber-faced ribs Q', separated from each other by three longitudinally-arranged finger-ways $Q^2$, which correspond in width. The lower edges of these ribs are faced with thick rubber strips $Q^3$, designed to exert a gentle and yielding pressure first upon the tobacco-leaf and then upon the blank cut therefrom, as will be described. The said clamp is supported and vertically operated by means of a rod R, passing upward through a vertically-arranged opening E', extending throughout the length of the plunger E aforesaid. The upper end of this rod is connected with the forked forward end of a horizontal lever S, terminating at its inner end in a hub S', rigidly secured to a shaft $S^2$, mounted on the bracket J aforesaid. At its opposite end the shaft $S^2$ is rigidly connected with a hub $S^3$, formed at the forward end of a lever $S^4$, the rear end of which is connected with a vertically-arranged operating-rod $S^5$, hung upon the shaft $N'$ aforesaid, and having its lower end $S^7$ provided with an antifriction-roll $S^8$, traveling upon the periphery of the clamp-operating cam $S^9$, which is shaped so as to effect the raising and lowering of the clamp as required with respect to the timing of the said wrapper-cutting punch. A spiral spring T, connected with the forward end of the lever S and with the arm K of the machine-frame K', is provided for drawing the clamp downward in opposition to the said cam.

Figures 4, 5:
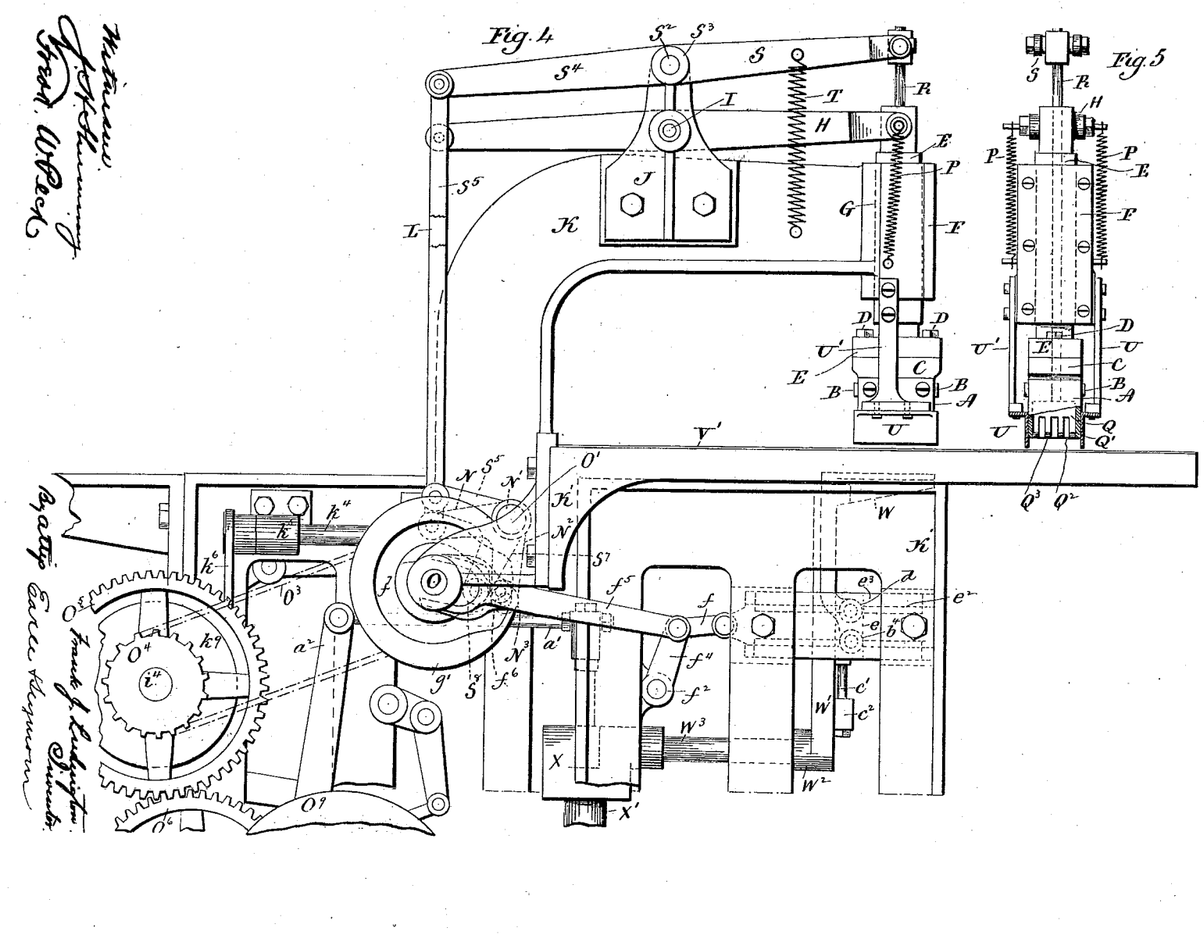
Fig. 4, an enlarged view, in side elevation, of the machine looking at its left-hand side, the lower portion of the machine being broken away.
Fig. 5, a detached view, in front elevation, of the wrapper-cutting mechanism.
Figures 6, 7:
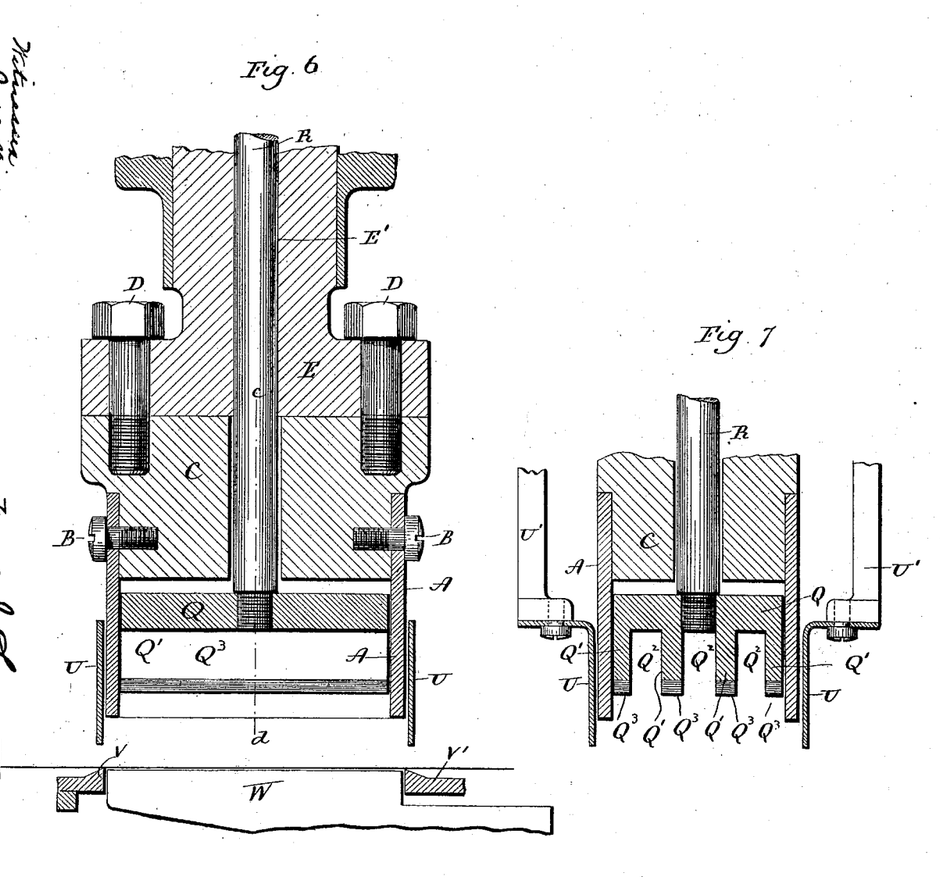
Fig. 6, a detached broken view, in vertical section, of the wrapper-cutting instrumentalities with particular reference to the punch, clamp, and die thereof, the said view also showing the traveling platen.
Fig. 7, a less comprehensive view on the line *c d* of Fig. 6.

The punch A is inclosed by means of a hollow rectangular stripper U, having its upper edge flanged and screwed to vertically-arranged supporting-arms U' U', the upper ends of which are bolted to the head G, as clearly shown in Fig. 4. The punch A coacts with a hollow rectangular wrapper-cutting die V, which is located in the inner edge of the feeding-table V', which is connected with the machine-frame K' in some suitable manner.

Figure 1:
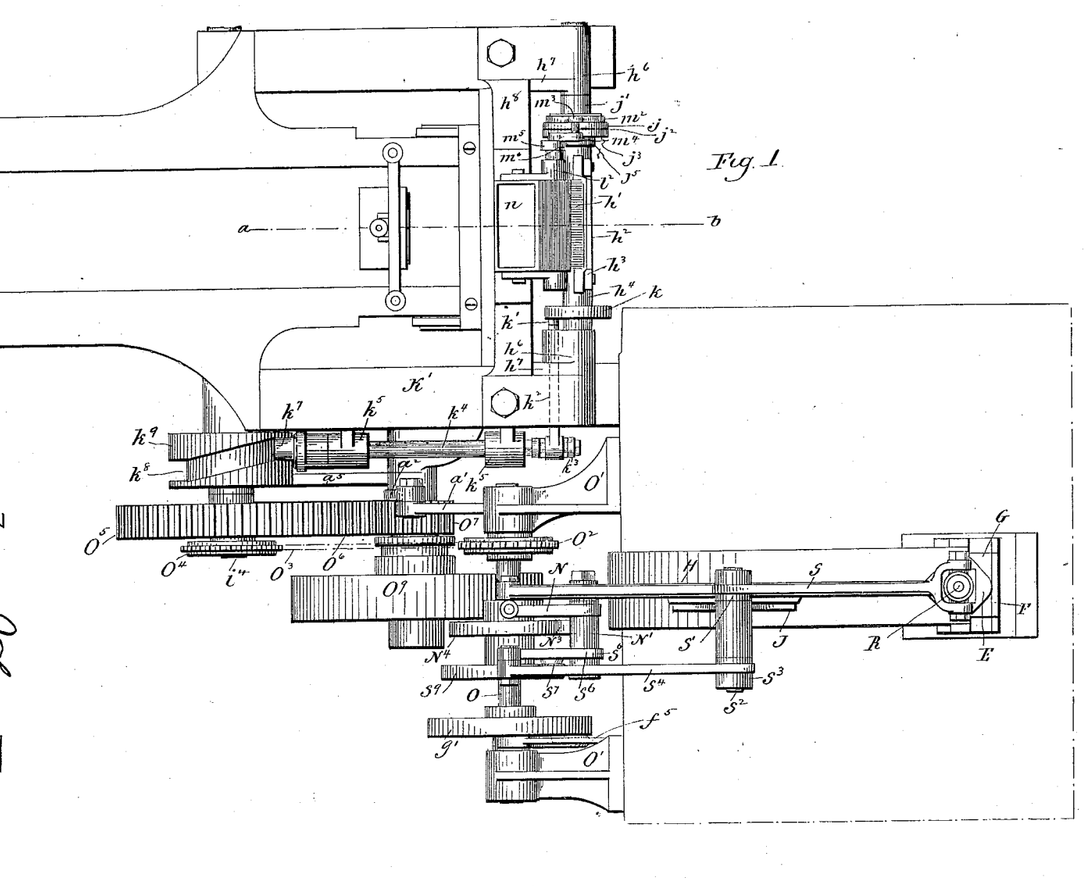
Figure 1, a plan view of the machine.
Figures 2, 2A:
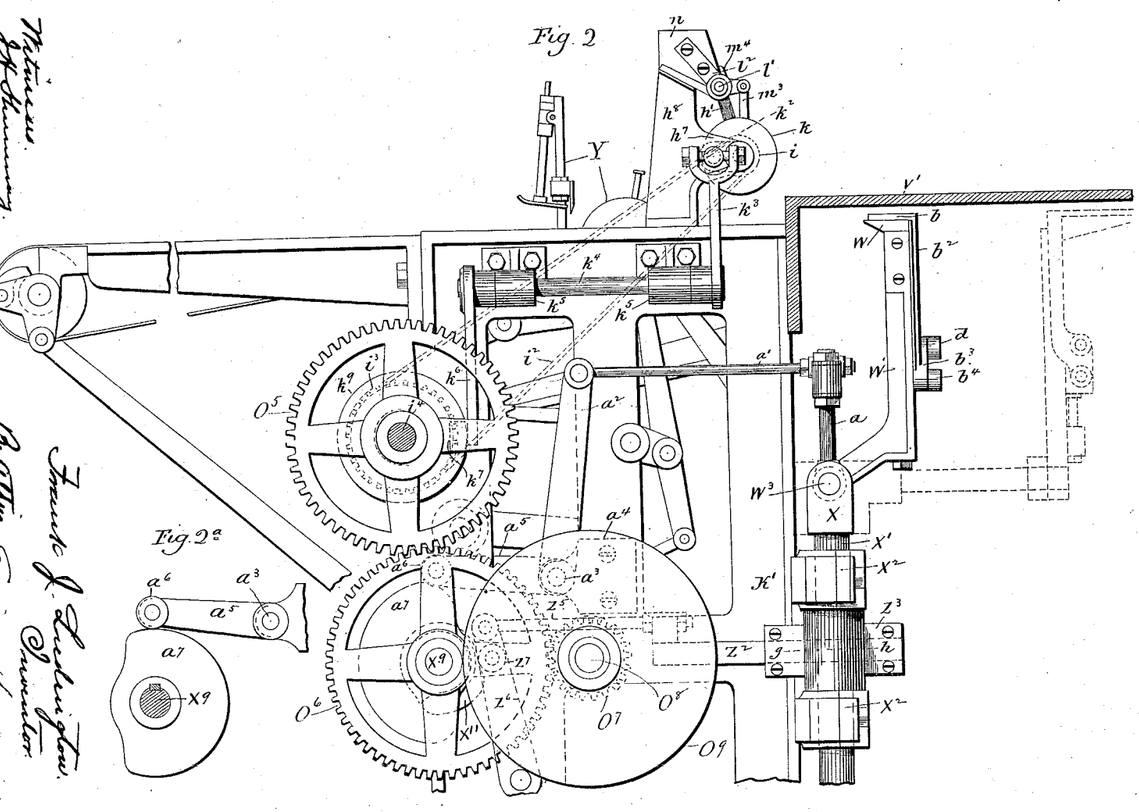
Figures 8, 10:
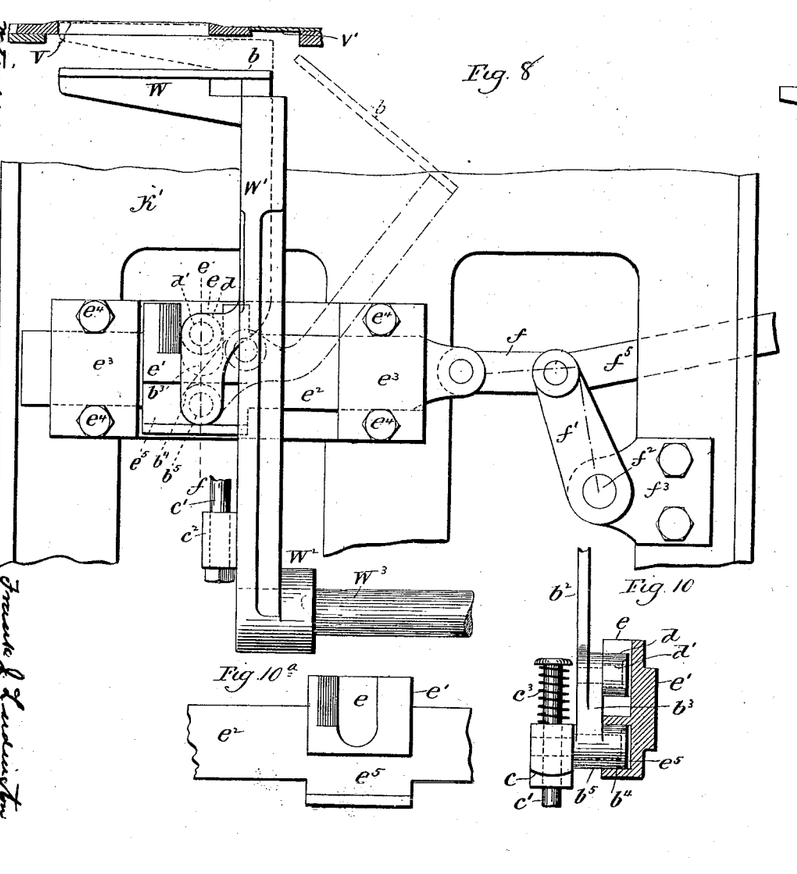
Fig. 8, a detached view, in side elevation, of the platen and gripper, together with some of their coacting parts, the platen being shown by broken lines in its elevated position, into which it is moved for receiving the wrapper, and by full lines in its depressed position, into which it is moved preparatory to the movement over it of the gripper.
Fig. 10, a detached sectional view on the line *e f* of Fig. 8.
Figure 9:
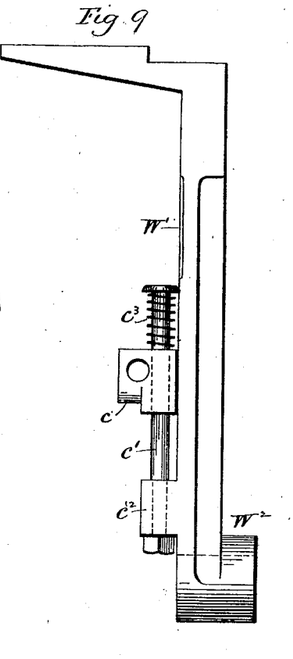
Fig. 9, a detached view, in side elevation, of the platen and platen-carrying arm.
Figure 13:
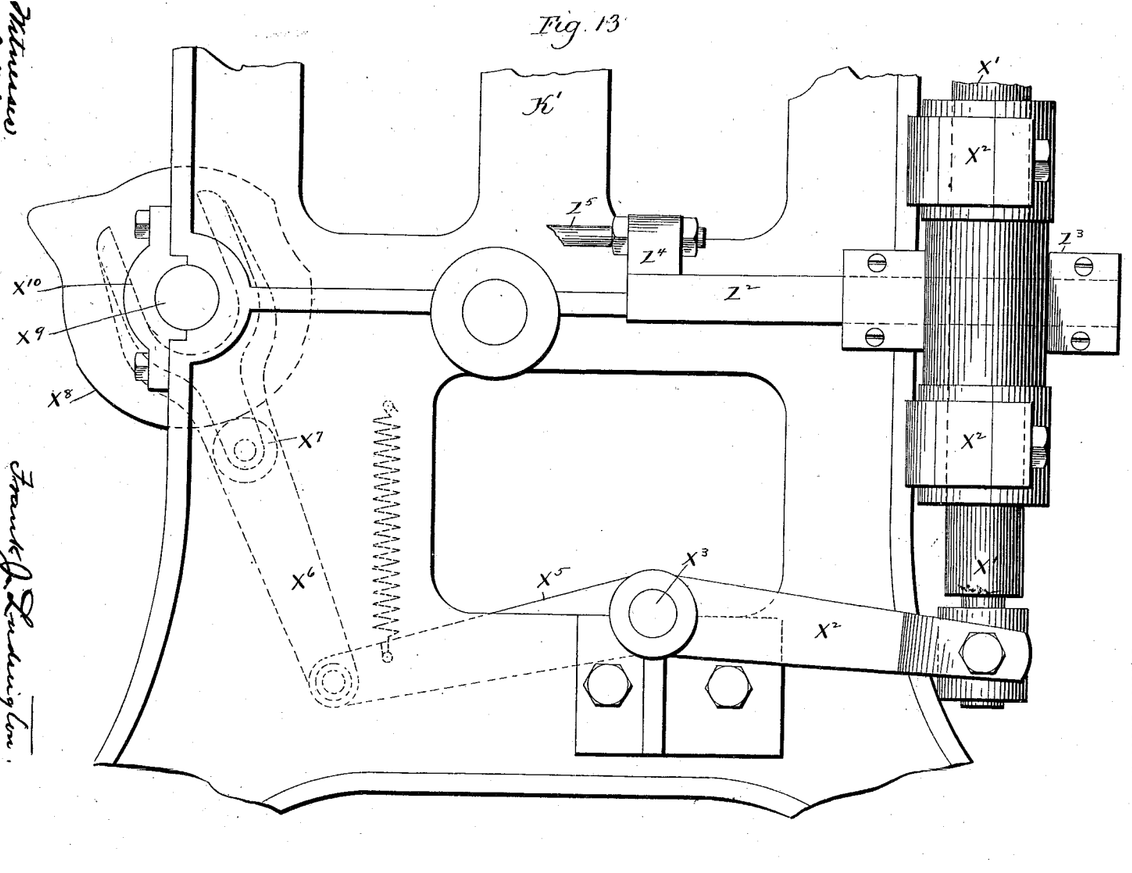
Fig. 13, an enlarged broken view, in side elevation, showing the mechanism employed for lifting the platen.

To support the wrapper portion of the leaf when the same is being cut and to convey the wrapper from the wrapper-cutting instrumentalities of the machine to the independently-organized filler-forming, wrapper-rolling, and wrapper-pasting instrumentalities thereof, I employ a wrapper-receiving platen W and provide for imparting a variety of movements thereto, as will be fully described. As shown in Fig. 8 of the drawings, this platen is represented in its tobacco-leaf-supporting position, and therefore as raised within the die V very nearly to the upper edge thereof, the upper and working face of the platen being rectangular in form and just enough smaller than the internal dimensions of the die to move freely up and down therein. The said platen is located at the upper end of a vertically-arranged platen-carrying arm W', formed at its lower end with a hub $W^2$, by means of which it is rigidly connected with a horizontally-arranged, combined vertically reciprocating or lifting, swinging and rocking shaft $W^3$, which is mounted so as to be free to rock within narrow limits in a T-shaped head X, located at the upper end of a vertically-movable and rotatable shaft X', supported in boxes $X^2$ $X^2$, bolted to the machine-frame K'. For the vertical movement of the platen W with respect to the die V the said shaft X' is connected at its projecting lower end with the forked forward end of a lever $X^2$, Fig. 13, the inner end of which is attached to a shaft $X^3$, mounted in a bracket $X^4$, bolted to the machine-frame. The said shaft $X^3$ is connected with a rearwardly-projecting lever $X^5$, the rear end of which is connected with a forked lever $X^6$, carrying an antifriction-roll $X^7$, which coacts with the platen-lifting cam $X^8$, adapted in its peripheral contour to impart the required vertical movements through the train of parts specified to the platen. The rear end of the lever $X^6$ is formed with a fork, which passes over the shaft $X^9$, secured in place by a cap $X^{10}$, bolted to the machine-frame K'. The said platen W is swung from its position under the wrapper-cutting instrumentalities of the machine, around into position to deliver the wrapper carried by it to the filler-forming, wrapper-rolling, and wrapper-pasting instrumentalities, which are organized independently of the wrapper-cutting instrumentalities for the sake of convenience in running and caring for the machine. Here I may remark that the filler-forming and wrapper-rolling instrumentalities may be of any approved construction. Thus they may be substantially the same as the filler-forming and wrapper-rolling instrumentalities shown and described in United States Patent No. 454,593, already referred to, and such have been shown in the accompanying drawings, on which they are collectively designated by the letter Y. I do not, however, limit myself to the use of those particular instrumentalities. As to the wrapper-pasting instrumentalities, I shall, by preference, employ those forming a part of my present invention and to be described later on. For the purpose of swinging the platen as described I employ a segmental pinion Z, Fig. 12, located in a horizontal plane and secured by a spline $Z'$ to the vertically-movable shaft $X'$, which is thus free to be raised and lowered, by means of the platen-lifting cam $X^8$, through the said pinion, which is meshed into by a horizontally-arranged rack $Z^2$, located in a horizontally-arranged box $Z^3$, secured to the machine-frame, Figs. 2 and 13. The inner end of this rack is formed with an upturned arm $Z^4$, which provides for the adjustable connection of the rack with the forward end of an operating-rod $Z^5$, the inner end of which is connected with the upper end of a lever $Z^6$, the lower end of which is pivotally connected with the machine-frame $K'$, Fig. 2. This lever is provided with an antifriction-roll $Z^7$, which coacts with the periphery of a platen-swinging cam $X^{11}$, mounted upon the horizontal driving-shaft $X^9$ and adapted in its peripheral contour to effect, through the train of parts just mentioned, the reciprocation of the rack at the right time to cause the swinging shaft $W^3$ to swing horizontally, so as to sweep the wrapper-receiving platen W from its position under the wrapper-cutting die V around to the filler-forming and wrapper-rolling and wrapper-pasting instrumentalities and back again under the said die V.

For the purpose of tilting the platen after it reaches the filler-forming and wrapper-rolling and wrapper-pasting instrumentalities, so as to bring it into position to deliver the wrapper thereto, I provide for rocking the shaft $W^3$ on its horizontal axis. To this end I mount upon the inner end of the said shaft an upwardly-projecting lever $a$, the upper end of which is adjustably connected with a rod $a'$, the rear end of which is connected with the upper end of a lever $a^2$, mounted at its lower end upon a shaft $a^3$, supported by a bracket $a^4$, secured to the machine-frame. The said shaft $a^3$ has also connected with it a rearwardly-projecting lever $a^5$, carrying an antifriction-roller $a^6$, which coacts with the periphery of the platen-tilting cam $a^7$, mounted upon the horizontally-arranged driving-shaft $X^9$ aforesaid and adapted in its peripheral contour to act through the train of parts just described in rocking the shaft $W^3$ so as to tilt the platen over into the position shown by Fig. 3.

Figures 11, 12:
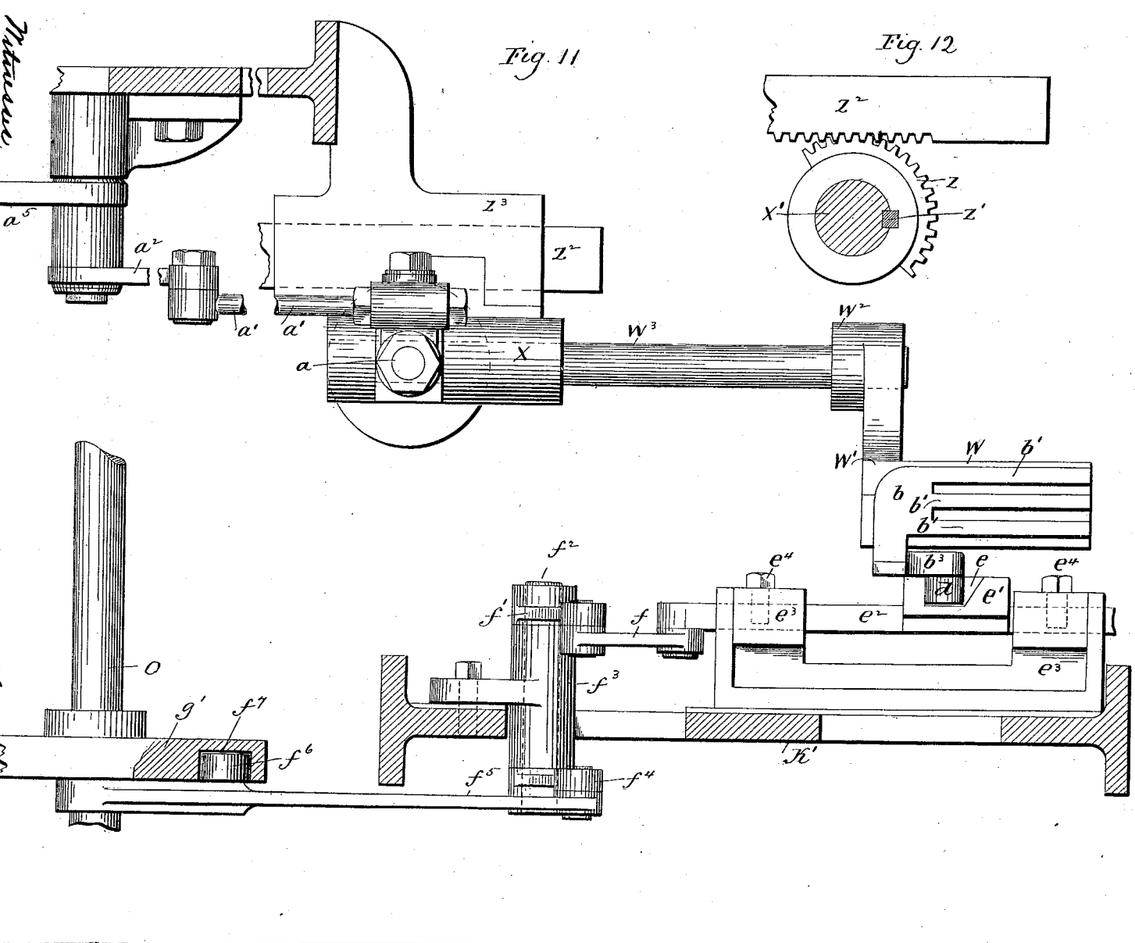
Fig. 11, a detached view, partly in plan and partly in section, showing the platen and the gripper, together with some of their operating connections.
Fig. 12, an enlarged detached sectional view of the rack and segmental pinion employed in conjunction with the movement of the platen, this view being taken on the line *g h* of Fig. 2.

In order to hold the tobacco wrapper flat upon the platen, I provide a wrapper-gripper $b$, Figs. 8 and 11, which I may properly call a "skeleton" or "finger" gripper, because it is constructed with three long fingers $b'$, which are adapted in their width and in their separation from each other to pass between the three finger-ways $Q^2$ $Q^2$ $Q^2$ of the wrapper-holding clamp Q, before described, so that while the rubber-faced ribs $Q'$ of the clamp are still holding the newly-cut wrapper down upon the wrapper-receiving platen W the fingers of the gripper may enter between the ribs of the clamp, and thus get into position to hold the blank down upon the platen in lieu of the clamp when the same retires by moving upward through the die V. The said gripper, which has an oscillating or vibrating movement, is mounted upon the upper end of a gripper-carrying arm $b^2$, the lower end of which is enlarged to form a head $b^3$, formed at its lower end with a forwardly-projecting hub $b^4$, receiving a heavy stud $b^5$, by means of which the gripper-carrying arm is connected with a gripper-lifting cam $c$, which receives the projecting inner end of the said stud, as shown in Fig. 10. The said cam $c$ is itself mounted for yielding vertical movement upon a long heavy pin $c'$, the lower end of which is firmly secured in a lug $c^2$, formed integral with and projecting inwardly from the lower end of the platen-carrying arm $W'$, with which the gripper-carrying arm is thus connected through the said lug $c^2$, pin $c'$, cam $c$, and stud $b^5$. A spiral spring $c^3$, interposed between the headed upper end of the pin $c'$ and the upper face of the cam $c$, provides for lifting the gripper-carrying arm with respect to the platen-carrying arm, and hence for lifting the gripper above the platen for releasing the wrapper, as will be described later on. It will be understood from the foregoing that the gripper and the gripper-carrying arm partake of the vertical swinging and tilting movements of the platen and platen-carrying arm. The said gripper has, in addition to these movements, a vibrating movement of its own, whereby it is swung over the platen to perform its gripping function and away from the platen to clear the same preparatory to cutting a new wrapper.

For the purpose of imparting vibratory or oscillating movement to the gripper I provide the head $b^3$ of its arm with an outwardly-projecting antifriction-roll $d$, mounted upon a small stud $d'$, which enters the upper portion of the said head. When the platen is swung by the shaft $W^3$ into its wrapper-receiving position under the die V, the said roll $d$ registers with and enters a vertically-arranged slot $e$, formed in the inner face of an integral head $e'$, located between the ends of a horizontally-arranged gripper-oscillating slide $e^2$, mounted in a box $e^3$, secured to the frame K' of the machine by bolts $e^4$. At the same time the roll $d$ enters the vertical slot $e$ the outwardly-projecting hub $b^4$, formed at the lower end of the said head $b^3$, as aforesaid, registers with and enters a horizontally-arranged clearance-slot $e^5$, formed in the head $e'$ and located directly below the vertically-arranged slot $e$, the said slot $e^5$ being long enough to permit the slide $e^2$ to move back and forth over the hub $b^4$. When the roll $d'$ is entered into the vertical slot $e$ and the hub $b^4$ is entered into the slot $e^5$ and the slide is reciprocated, the side walls of the slot $e$ will engage with the roll, so as to cause the gripper-carrying arm to rock upon its stud $b^5$, as upon a center, the platen-carrying arm being at this time stationary under the die V. The said gripper-operating slide is connected at its forward end with a link $f$, which is in turn connected with the upper end of a lever $f'$, attached at its lower end to the inner end of a shaft $f^2$, journaled in a bracket $f^3$, and having a lever $f^4$ secured to its opposite end. An operating-lever $f^5$, connected at its forward end with the said lever $f^4$, is forked at its inner end and set over the shaft O and provided with an antifriction-roll $f^6$, which travels in a cam-groove $f^7$ in the gripper-oscillating slide-cam $g'$, which is mounted on the said shaft $O^4$, operates through the lever $f^5$, the lever $f^4$, the shaft $f^2$, the lever $f'$, and the link $f$ to reciprocate the said gripper-oscillating slide $e^2$ back and forth. It will be understood, of course, that as soon as the shaft $W^3$ begins to swing the platen and its adjuncts from its wrapper-receiving to its wrapper-delivering position the roll $d$ and the lug $b^4$ of the gripper-carrying arm-head $b^3$ move out of the slots $e$ and $e^5$, respectively, of the head $e'$ of the said slide $e^2$.

Figure 3:
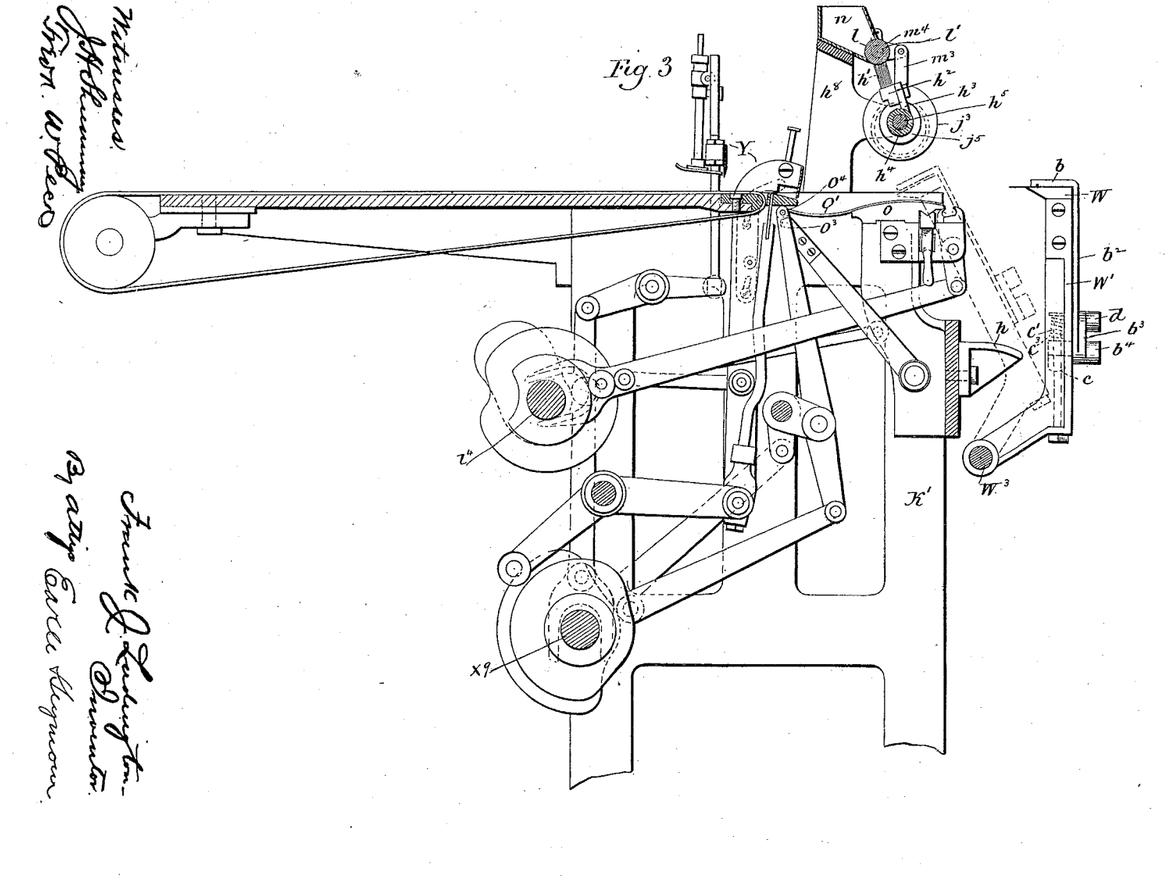
Fig. 3, a view of the machine, taken on the irregular line *a b* of Fig. 1.

For the purpose of lifting the gripper $b$ very slightly above the face of the platen W, as shown by broken lines in Fig. 3, so as to release the wrapper preparatory to rolling the same around the filler, I provide a stationary cam $h$, Fig. 3, which is bolted to the machine-frame in position to be located directly under the gripper-lifting cam $c$ when the platen W and platen-carrying arm W' are in their tilted positions, in which they are shown by broken lines in Fig. 3. The gripper-lifting cam $c$ does not ride up over the cam $h$, but settles down upon the same, so as to compress the spring $c^3$ and lift the gripper and gripper-carrying arm with respect to the platen and platen-carrying arm at about the termination of the slight retracting movement imparted to the platen after it takes its tilted position, as will be described later on.

Figure 14:
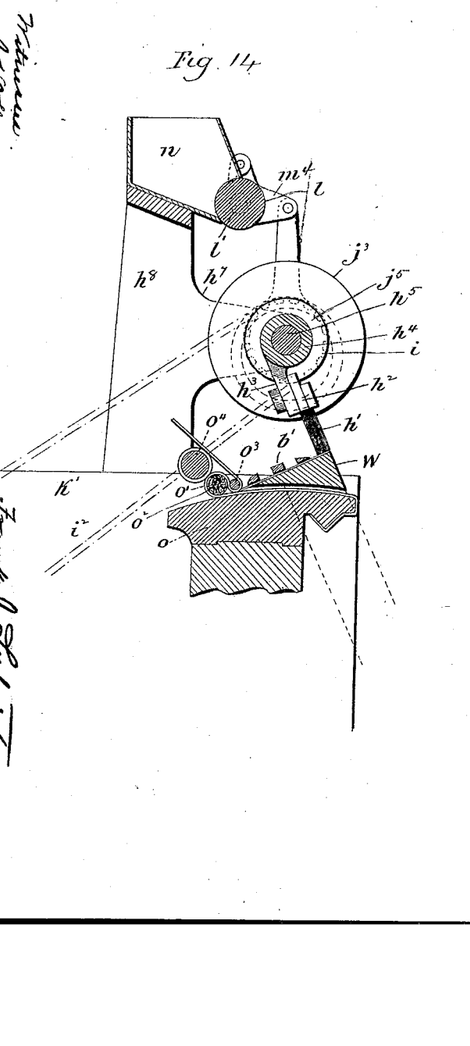
Fig. 14, an enlarged broken view, in vertical section, particularly designed to show my improved wrapper-pasting instrumentalities and the mode of applying the paste to the wrapper.
Figure 15:
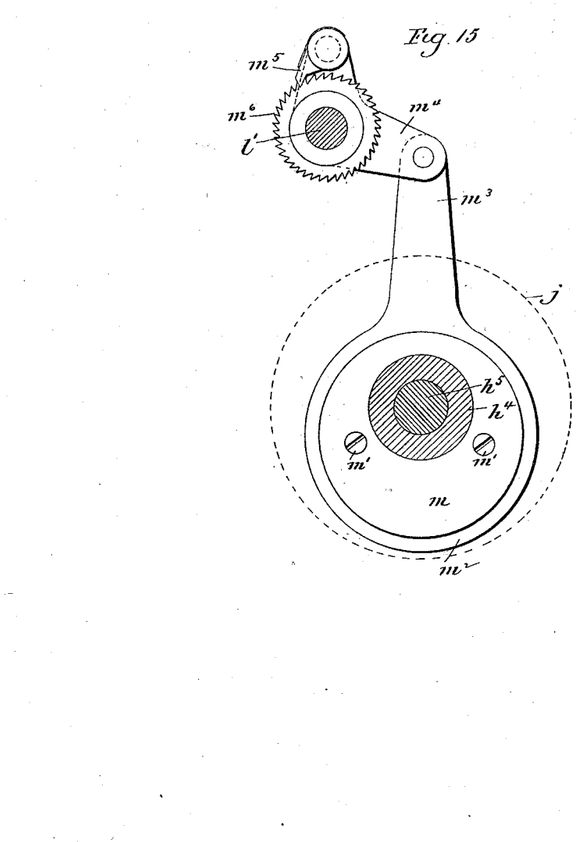
Fig. 15, a view, partly in elevation and partly in vertical central section, on a still larger scale than Fig. 14 and showing the means employed for rotating the paste-roll.
Figures 16, 17:
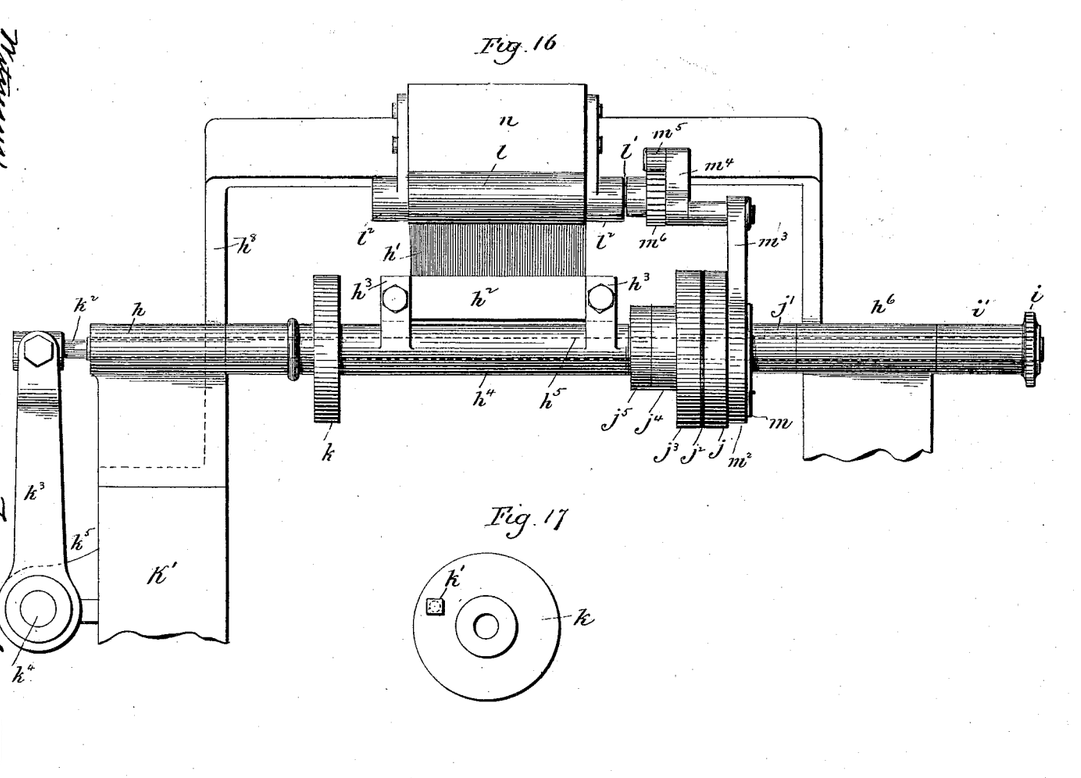
Fig. 16, a view in front elevation of the wrapper-pasting instrumentalities.
Fig. 17, a detached view in elevation of the disk carrying the stop-pin.

My improved wrapper-pasting instrumentalities employ a brush $h'$, mounted in a brush-holder $h^2$, secured by its ends to arms $h^3\ h^3$, formed upon a long sleeve $h^4$, mounted upon a shaft $h^5$, supported at its ends in bearings $h^6\ h^6$, formed at the forward ends of the horizontal arms $h^7$, Fig. 14, projecting forward from a frame $h^8$, secured to the machine-frame K'. The said shaft $h^5$ is continuously rotated by means of a sprocket-wheel $i$, secured to the shaft by means of its long hub $i'$ and driven by a sprocket-chain $i^2$, running over a sprocket-wheel $i^3$, mounted on the shaft $i^4$, which is one of the main driving-shafts of the machine. For communicating the motion of the shaft $h^5$ to the brush-holding sleeve $h^4$ and brush I employ a friction-disk $j$, which is secured to the shaft by means of its outwardly-projecting hub $j'$ and which coacts through the medium of a fibrous friction-washer $j^2$ with a corresponding friction-disk $j^3$, secured by its hub $j^4$ and a jam-nut $j^5$ upon the adjacent end of the brush-holding sleeve $h^4$, which is externally threaded for the attachment of the said disk $j^3$ and nut $j^5$. It is designed that the two disks shall be so adjusted with respect to each other and to the friction-washer $j^2$ between them that the friction developed will be sufficient to cause the rotation of the brush-holder sleeve. In order, however, to produce an intermittent rotation of the said sleeve and an intermittent action of the brush, I mount upon the opposite end of the sleeve a stop-disk $k$, provided with an outwardly-projecting stop-pin $k'$, which coacts with a long horizontally-arranged reciprocating stop-arm $k^2$, the outer end of which is mounted in the forked upper end of a lever $k^3$, secured to a horizontally-arranged shaft $k^4$, mounted in bearings $k^5\ k^5$, bolted to the machine-frame K'. The said shaft $k^4$ is provided at its opposite end with a depending lever-arm $k^6$, carrying at its lower end an antifriction-roll $k^7$, traveling in a cam-groove $k^8$, formed in a cam $k^9$, mounted upon the shaft $i^4$. The said cam $k^9$ is constructed so that the stop-arm $k^2$ will be normally engaged with the stop-pin $k'$ of the disk $k$, mounted on the brush-holding sleeve $h^4$, which will normally be held against rotation by the shaft $h^5$ under the action of the friction developed between the disks $j\ j^3$ and the friction-washer $j^2$, so that normally the disk $j$ will ride over the washer $j^2$. Just before, however, the time comes for pasting the wrapper the cam $k^9$ operates to retract the arm $k^2$ from engagement with the pin $k'$, leaving the disk $k$, and hence the brush-holding sleeve, free to rotate under the power transmitted through the friction-disks $j\ j^3$ and washer $j^2$. The brush-holding sleeve now rotates, causing the brush to receive a supply of paste from the paste-roll $l$ and then apply the same to the tobacco-wrapper, immediately after which the cam $k^9$ operates to move the stop-arm $k^2$ inward into position to engage with the stop-pin $k'$ of the disk $k$, mounted on the brush-holder sleeve $h^4$, which is again held against rotation against the effort which the friction-disk $j$ and the friction-washer $j^2$ constantly make to rotate it under power derived from the constantly-rotating shaft $h^5$.

For the rotation of the paste-roll $l$ I mount upon the hub $j'$ of the friction-disk $j$ an eccentric $m$, secured in place by screws $m'\ m'$, entering the disk $j$, and surrounded by an eccentric-stop $m^2$, having an arm $m^3$ connected with one arm of a bell-crank lever $m^4$, the other arm of which carries a pawl $m^5$, which engages with the teeth of a ratchet-wheel $m^6$, mounted on the shaft $l'$, which carries the paste-roll $l$, the said shaft being mounted in boxes $l^2$ $l^2$, located upon the upper portion of the frame $h^8$, which supports the paste-reservoir $n$, in the lower end or mouth of which the paste-roll rotates and from which its surface takes up the paste as the paste-roll is rotated by the step-by-step movement communicated to it under the action of the ratchet $m^6$, pawl $m^5$, bell-crank lever $m^4$, and eccentric $m$.

Although it is not my purpose to describe the filler-forming and wrapper-rolling instrumentalities, for convenience of description I may refer to the rolling-table $o$, the rolling-apron $o'$, the unwrapped cigarette $o^2$, and the horizontally-arranged rods $o^3$ and $o^4$, which control the apron, all as set forth in the patent specified by number at the outset of this description.

Having now described in detail the improved instrumentalities of my machine for making all-tobacco cigarettes, I will briefly describe the operation thereof so far as its improved features are concerned.

For convenience of description it will be assumed that the wrapper-receiving platen W is in its elevated position and that a tobacco-leaf has been placed by hand by an attendant over the die V. The machine being now started up, the clamp Q descends to bring its rubber-faced ribs Q' into engagement with that portion of the leaf which is to be cut out and presses the same firmly down upon the platen. The punch A now descends and cuts the wrapper from the leaf and retires, the stripper U acting to strip the remaining portions of the leaf from the punch. The platen-lifting cam $X^8$ now acts through the vertically-arranged shaft $X'$ to lower the platen to a position below the die. As the platen descends it is followed by the clamp, which is moved downward through the die by the action of the clamp-operating cam $S^8$. Thus by the action of the cams $X^8$ and $S^8$ the platen and die are brought into the positions in which they are shown by full lines in Fig. 8. The gripper-operating slide $e^2$ now operates and acts upon the roll $d$ of the gripper-arm head $b^3$, so as to swing the gripper $b$ into the space between the lower face of the die and the upper face of the platen, the fingers $b'$ of the gripper passing into the finger-ways $Q^2$, formed between the rubber-faced ribs $Q'$ of the clamp. The platen-lifting cam $X^8$ now acts again to lift the platen slightly and so as to firmly bind the newly-cut wrapper between it and the gripper. The platen having been lifted as set forth, whereby the gripper is caused to hold the wrapper, the gripper takes the place, as it were, of the clamp, which is then moved upward by the action of the said cam $S^8$ through the die V into position to permit another leaf to be fed over the same. The platen-swinging cam $Z^8$ now brings the rack $Z^2$ into play and, acting through the segmental pinion Z, causes the shaft $W^3$ to be swung horizontally, so as to carry the platen and its adjuncts from their receiving to their delivering positions. This movement of the shaft $W^3$ covers an arc of about ninety degrees; but that may be more or less, according to the particular construction of the machine. When the shaft $W^3$ begins its said swinging movement, the roll $d$ and hub $b^4$ of the gripper-arm head $b^3$ are cleared from the slots $e$ and $e^5$ of the slide $e^2$, as before mentioned. After the shaft $W^3$ has been swung around, as described, by means of the said rack and segmental pinion it is rocked on its horizontal axis to tilt the platen and its adjuncts into their delivering positions with respect to the filler-forming and wrapper-roller and wrapper-pasting instrumentalities of the machine, as shown by broken lines in Fig. 3, the rocking of the shaft being effected by means of the cam $a^7$ and the train of parts between the same and the arm $a$, which extends upward from the shaft $W^3$. The said cam $a^7$ is shaped so that it tilts the platen-carrying arm and the platen inward beyond their delivering positions and then pulls them outward in a slow drawing movement until they reach their delivering positions upon the rolling-table, whereby the inwardly-projecting edge of the wrapper is uncurled and left flat upon the said rolling-table. Now after the said projecting inner edge of the wrapper has been "caught," so to speak, by the wrapper-rolling instrumentalities, the stop-arm cam $k^9$ operates the stop-arm $k^2$ to release the brush-holding sleeve, which then immediately begins to rotate in the direction of the arrow seen in Fig. 12, the brush $h$ taking a supply of paste from the paste-roll $l$ and then sweeping over and pasting the exposed outer edge of the wrapper, as shown in the said figure. The cam $a^7$ now acts to rock the shaft $W^3$ slightly, so as to draw the platen-carrying arm downward, whereby the gripper-lifting cam $c$ is engaged with the fixed cam $h$, causing the spring $c^3$ to be compressed and the gripper to be lifted above the face of the platen, so as to release the wrapper, which is then drawn away from the platen and rolled. I particularly wish to note that the inner edge of the wrapper is caught by the wrapper-rolling instrumentalities and that the outer edge of the wrapper is pasted while the wrapper is still held firmly down upon the platen by the gripper. I may also point out that as the platen is gradually drawn away from the rolling-table it stretches and keeps flat the wrapper, which clings to it on account of the moisture which the tobacco contains, the retreating action of the platen being a little faster than the action of the wrapper-rolling instrumentalities. The cam $a^7$ continuing to act tilts the platen-carrying arm and the adjuncts thereof back into the vertical position, in which it is shown by Fig. 3 of the drawings. The rack $Z^2$ and segmental pinion Z now act under the control of the said cam $X^8$ to swing the shaft $W^3$ back, so as to restore the platen to its first position under the die. Just before the shaft $W^3$ reaches this position the roll $d$ and hub $b^4$ of the gripper-carrying arm-head are entered into the slots $e$ and $e^5$ of the slide $e^2$, which is then caused by its connections with the cam $g'$ to be reciprocated for swinging the gripper into the retired position, in which it is shown by Fig. 8 of the drawings. The cam $X^8$ now acts through its connections with the lower end of the shaft $X'$ to lift the shaft $W^3$, and hence the platen, which is raised into the position shown by broken lines in Fig. 8, in which position it initially receives another wrapper, and the operations above detailed are then repeated, and so on.

It is apparent that in carrying out my invention some changes from the construction and arrangement of parts herein shown and described may be made. Thus I may employ different filler-forming and wrapper-rolling instrumentalities from those shown and do not confine myself to the use of such wrapper-pasting instrumentalities as I have illustrated and described; nor is it necessary for me to swing the platen and its attached gripper through the arc of a circle, for I might arrange the wrapper-cutting instrumentalities with respect to the other instrumentalities so that a different movement of the platen would be required; but, however the instrumentalities may be arranged, I must impart a long movement to the platen for conveying it from the wrapper-cutting instrumentalities to the other instrumentalities and secondary movements to it at the ends of its long movement for causing it to properly coact with the instrumentalities when in its receiving and delivering positions, respectively. It is also apparent that the particular means employed for operating the platen and gripper and pasting instrumentalities may be widely varied. I would therefore have it understood that I do not limit myself to the exact construction herein shown, but hold myself at liberty to make such changes and alterations as fairly fall within the spirit and scope of my invention.

Having fully described my invention, what I claim as new, and desire to secure by Letters Patent, is—

1. In a machine for making cigarettes, having wrapper-cutting, filler-forming, wrapper-rolling and wrapper-pasting instrumentalities, the combination with a wrapper-receiving platen, means for raising and lowering the said platen with respect to the wrapper-cutting instrumentalities, for moving it to impart secondary movement to it at the wrapper-rolling and wrapper-pasting instrumentalities, a movable gripper connected with the said platen, means for moving the gripper independent of the platen when the same is coacting with the cutting instrumentalities, and also for moving it independently of the platen when the same is coacting with the wrapper-rolling and wrapper-pasting instrumentalities.

2. In a machine for making cigarettes having wrapper-cutting, wrapper-rolling and wrapper-pasting instrumentalities, the combination with a wrapper-receiving platen, of a movable gripper connected therewith, means for raising and lowering the platen with respect to the cutting instrumentalities, for moving it thence to the wrapper-rolling and wrapper-pasting instrumentalities, for imparting secondary movement to it at the wrapper-rolling and wrapper-pasting instrumentalities, means for swinging the gripper over the platen which is lifted to meet the gripper, whereby the wrapper is clamped between the platen and the gripper, and means for lifting the gripper independently of the platen for releasing the wrapper when the platen is in its delivering position at the wrapper-rolling and wrapper-pasting instrumentalities.

3. In a machine for making cigarettes, the combination with wrapper-cutting instrumentalities including a punch, a die and a clamp, of a wrapper-receiving platen, means for raising and lowering the same with respect to the said punch, die and clamp, and for moving it into its delivering position, and a wrapper-gripper connected with the said platen and moving therewith, and having movement independently thereof, the said gripper being swung over and away from the platen which is lifted with respect to the gripper when the same is over it for clamping the wrapper between them.

4. In a machine for making cigarettes, the combination with wrapper-cutting instrumentalities including a punch, a die and a clamp, of means for moving the punch and clamp independently of each other, a wrapper-receiving platen, means for raising and lowering the said platen with respect to the said instrumentalities so as to coact with the clamp in holding the tobacco while the punch is coacting with the die to cut a wrapper from the tobacco, a wrapper-gripper connected with and movable over the platen and coacting therewith to hold the wrapper thereupon after the retirement of the clamp, means for moving the platen and gripper into their delivering positions, and means for operating them there.

5. In a machine for making cigarettes, the combination with a wrapper-receiving platen, of an oscillating wrapper-gripper adapted to be swung over the platen after which one of the parts is moved with respect to the other so as to clamp a wrapper between them, means for moving the platen and gripper into their delivering positions, means for additionally operating them for the delivery of the wrapper and for swinging the gripper away from the platen to clear the same for the reception of another wrapper.

6. In a machine for making cigarettes, the combination with wrapper-cutting and wrapper-rolling and wrapper-pasting instrumentalities, of a platen, a platen-carrying arm, a horizontally-arranged shaft to which the said arm is secured, and means for raising and lowering the said shaft for raising and lowering the platen with respect to the wrapper-cutting instrumentalities, for swinging the said shaft for bringing the said platen into range with the wrapper-rolling and wrapper-pasting instrumentalities, and for rocking the shaft to tilt the platen with respect to the said instrumentalities last mentioned.

7. In a machine for making cigarettes, the combination with a platen, a platen-carrying arm pivoted at its lower end, of a gripper, a gripper-carrying arm pivotally connected at its lower end with the platen-carrying arm, means for engaging with the gripper-carrying arm for oscillating it to cause the gripper to move over and away from the platen, and means for lifting the platen-carrying arm independently of the gripper-carrying arm so as to clamp a wrapper between the platen and gripper when the latter is swung over the former.

8. In a machine for making cigarettes, the combination with the wrapper-cutting and wrapper-rolling and wrapper-pasting instrumentalities thereof, of a platen, a platen-carrying arm, a horizontally-arranged shaft to which the said platen-carrying arm is secured, means for imparting vertical, swinging and rocking movements to the said shaft for raising and lowering the platen with respect to the wrapper-cutting instrumentalities, for swinging it into range with the wrapper-rolling and wrapper-pasting instrumentalities, and for tilting it for the delivery of the wrapper carried by it to the instrumentalities last mentioned, a gripper for holding a wrapper flat upon the platen, a gripper-carrying arm pivotally and yieldingly connected with the platen-carrying arm, and means for oscillating the gripper with respect to the platen, and also for lifting it with respect thereto.

9. In a machine for making cigarettes, the combination with a platen, of a platen-carrying arm, a horizontally-arranged shaft to which the said arm is secured, means for lifting the said shaft, for swinging it, and for rocking it, a gripper adapted to be swung over and away from the upper face of the platen, a gripper-carrying arm, a cam yieldingly connected with the platen-carrying arm, and having the gripper-carrying arm pivotally attached to it, and a gripper-operating slide by means of which the gripper is oscillated through the medium of the gripper-carrying arm for moving it over and away from the upper face of the platen.

10. In a machine for making cigarettes, the combination with wrapper-rolling instrumentalities, of a platen, a gripper connected with the platen for movement therewith, means for moving the platen and gripper into their delivering positions, means for imparting secondary movements to the gripper, independent of the movements of the platen, in the receiving and delivering positions of the platen, and wrapper-pasting instrumentalities including a brush arranged to paste the outer edge of the wrapper while the same is still held upon the platen by the gripper.

11. In a machine for making cigarettes, the combination with wrapper-rolling instrumentalities, of wrapper-pasting instrumentalities comprising a brush under which the wrappers are fed, means for rotating the said brush, a friction-coupling between the brush and the said means for rotating the same, a stop mechanism for normally holding the brush against rotation, means for intermittently actuating the said stop mechanism which is operated to release the brush to permit it to be frictionally rotated just prior to the time the brush performs its pasting function, and means for delivering wrappers to the said wrapper-pasting and wrapper-rolling instrumentalities.

12. In a machine for making cigarettes, the combination with wrapper-rolling instrumentalities, of wrapper-pasting instrumentalities comprising a brush under which the wrappers are fed, a brush-holder, a sleeve with which the said holder is connected, a revolving shaft upon which the said sleeve is mounted, a friction-disk mounted upon and revolving with the said shaft, a coacting friction-disk mounted upon the sleeve, a stop-cam also connected with the sleeve, an intermittently-operated stop mechanism coacting with the said cam for engaging therewith to normally hold the sleeve and brush against rotation, for which purpose they are released by the stop mechanism just before the performance of the pasting operation; and means for delivering wrappers to the said wrapper-pasting and wrapper-rolling instrumentalities.

13. In a machine for making cigarettes, the combination with wrapper-cutting instrumentalities including a punch, a die, and a clamp, of means for moving the punch and clamp independently of each other, a wrapper-receiving platen, means for raising and lowering the said platen with respect to the said instrumentalities so as to coact with the clamp in holding the tobacco while the punch is coacting with the die to cut a wrapper from the tobacco, and means coacting with the platen for engaging the cut wrapper thereupon before the clamp is lifted to release the cut wrapper.

In testimony whereof I have signed this specification in the presence of two subscribing witnesses.

FRANK J. LUDINGTON.

Witnesses:
FREDERIC C. EARLE,
GEORGE D. SEYMOUR.